Dec. 6, 1966     GUNJI KOBAYASHI     3,290,230
SOLAR STILL APPARATUS FOR EXTRACTING
AND COLLECTING WATER FROM SOIL

Filed Aug. 1, 1962     2 Sheets-Sheet 1

INVENTOR.
GUNJI KOBAYASHI
BY Kurt Kelman
AGENT

INVENTOR
GUNJI KOBAYASHI
By Kurt Kelman
AGENT

United States Patent Office 3,290,230
Patented Dec. 6, 1966

3,290,230
SOLAR STILL APPARATUS FOR EXTRACTING AND COLLECTING WATER FROM SOIL
Gunji Kobayashi, Tokyo, Japan, assignor to Nippon Electric Company, Limited, Tokyo, Japan
Filed Aug. 1, 1962, Ser. No. 214,119
Claims priority, application Japan, Aug. 9, 1961, 36/28,694
11 Claims. (Cl. 202—234)

The present invention relates to apparatus for collecting fresh water from the soil by means of solar radiation.

Even seemingly dry soil contains water but, due to different ground conditions, it is often very difficult to distill fresh water from the ground. Particularly in arid areas, such as deserts, complex equipment has been used for this purpose and with often limited success.

It is the principal object of the present invention to obtain appreciable amounts of fresh water from the soil with an exceedingly simple and economical apparatus which utilizes the heat of the sun to evaporate the water in the soil and the cooling of the outside air to condense the evaporated water.

This and other objects and advantages are accomplished according to the invention by placing a preferably heat-insulated frame air-tightly on the soil and placing a top member air-tightly on the frame. The top member is of a material which is impervious to air and at least a part of the top member is of a material pervious to solar radiation. The solar radiation penetrates through the radiation-pervious material and causes the water in the soil to evaporate. A cooling means is spaced from the soil and has a surface whereon the water vapor condenses into a dew. A means is arranged within the frame for collecting the dew, a water sump is installed outside the frame and conduit means connects the dew collecting means with the water sump.

In one embodiment of the invention, the cooling means is simply constituted by the top member whose inner surface is cooled by the atmospheric air passing over the top member.

In another embodiment, two top members are provided, one being of a solar radiation-pervious material and the other one being of metal whose inner surface is cooled by the atmospheric air passing over the metal member while the one top member is heat-insulated.

Figure 1:
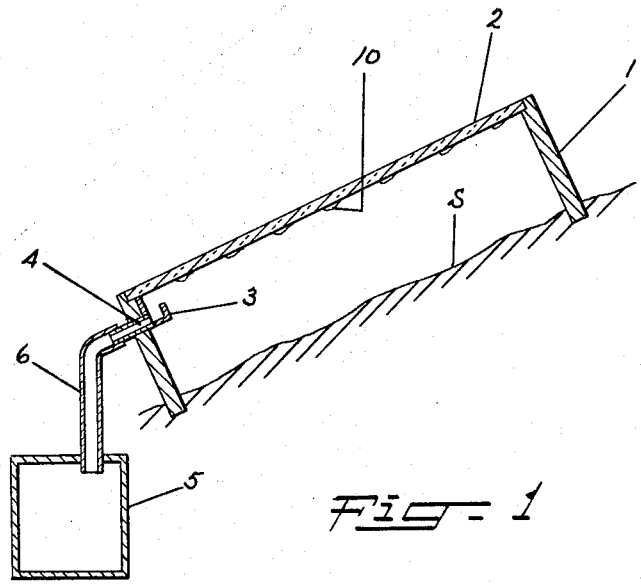
Figure 2:
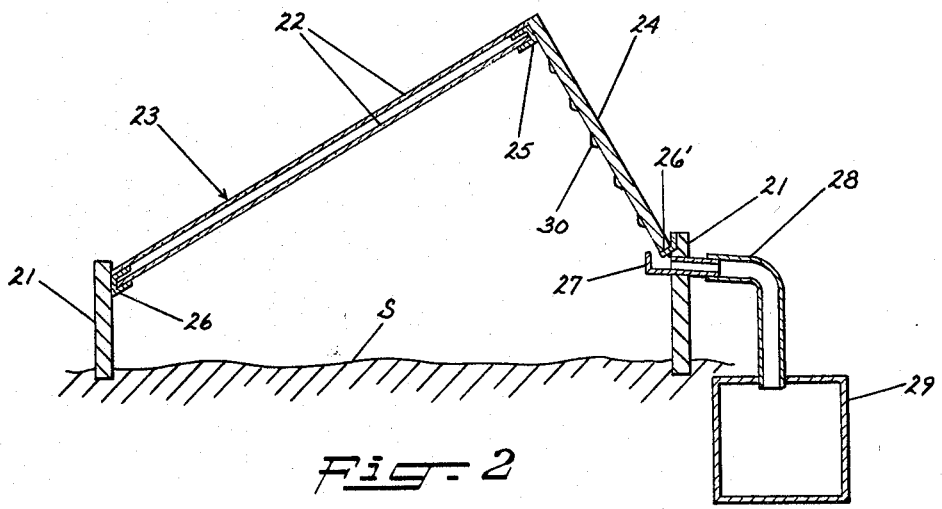
Figure 3:
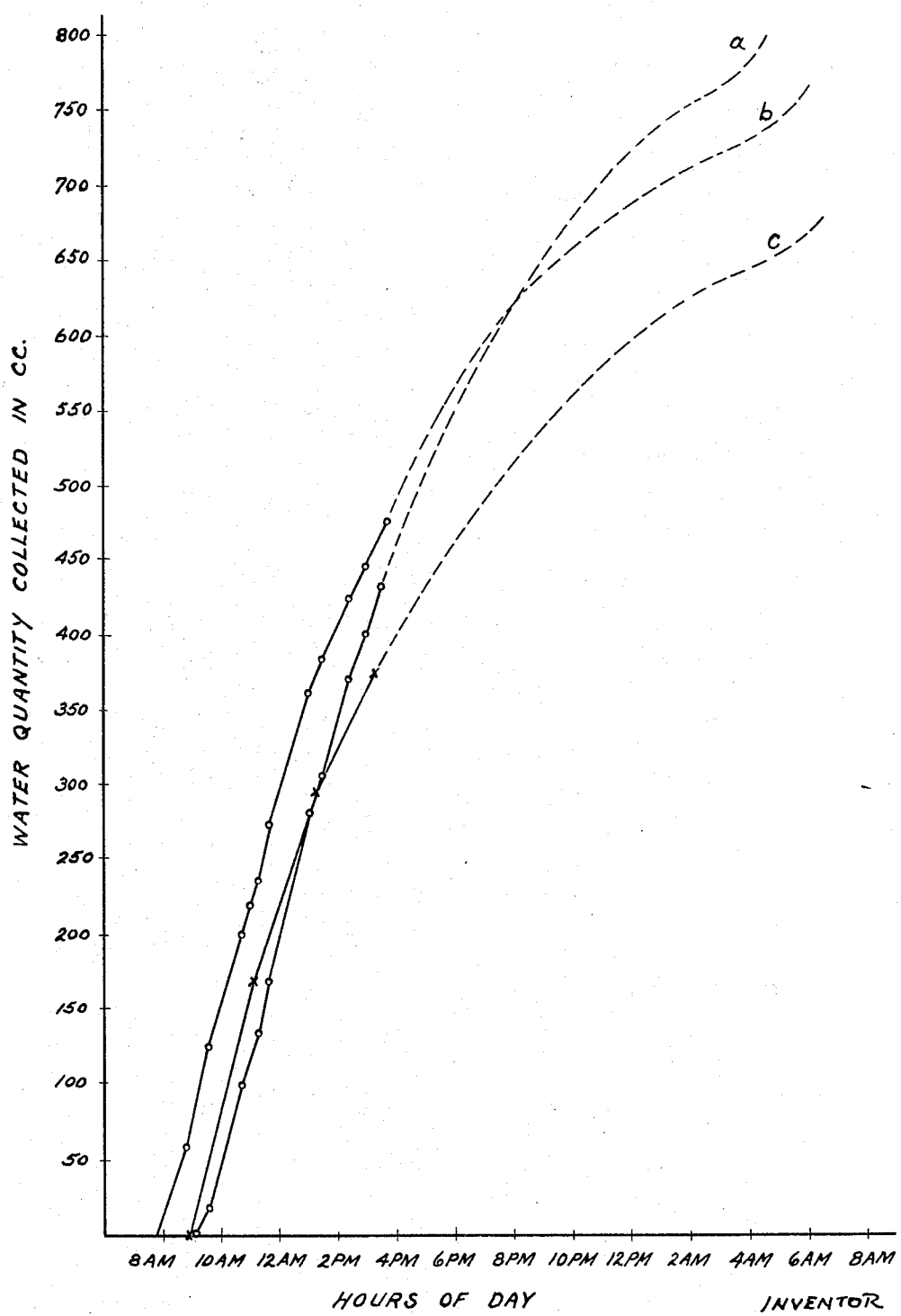

The invention will be more fully explained in the following detailed description of two embodiments thereof, taken in conjunction with the accompanying drawing wherein FIG. 1 is a diagrammatic vertical cross section of one embodiment;

FIG. 2 is a similar view of another embodiment of the apparatus of this invention; and FIG. 3 is a graph showing the water output.

Referring first to FIG. 1, there is shown a frame 1 which air-tightly engages the surface of the soil S. The frame is of a heat insulating material, such as wood or foamed plastic, for instance polystyrene foam plates. A top member 2 is air-tightly placed on the frame, a hermetic joint being provided between the top member and the frame 1, whereby the frame 1 and the top member 2 jointly define a downwardly open receptacle whose orifice is surrounded by the frame. The top member is transparent or translucent and may consist, for instance, of glass or synthetic resin, such as "Plexiglas." The top member material is impervious to air and pervious to solar radiation.

When solar radiation hits the top member and penetrates therethrough, the resultant heat within the frame causes the water in the soil to evaporate. Atmospheric air passing over the top member 2 cools the inner surface of the top member and causes the evaporated water to condense thereon and to form dew 10. The cooling surface is downwardly inclined from the horizontal so that the dew runs off into gutter means 3 which is arranged within the frame adjacent the downward end of the cooling surface. The dew is thus collected in the trough or gutter 3 which is mounted on the frame wall at a height spaced about one fifth the frame height from the frame edge.

As shown, a water sump 5 is installed outside the frame 1 and conduit means connects the dew collecting means 3 with the water sump. The conduit means comprises a pipe 6 and a port 4 in the frame adjacent the gutter 3. If desired, the frame 1 may be covered by a heat insulating material or jacket to accentuate the temperature difference between the interior of the frame adjacent the soil and the inner surface of the air-cooled top member 2. The frame may be rectangular or may have any other suitable shape.

In the embodiment of FIG. 2, the frame 21 is similar to the frame of FIG. 1 and also engages soil S with an airtight joint. In this embodiment, however, two top members are provided, the first top member 22 being heat-insulating and pervious to solar radiation while the second top member 24 is air-cooled and of metal.

In the illustrated embodiment, the heat-insulating top member 22 consists of two parallel transparent plates, for instance of glass or of transparent synthetic resin, defining a fluid-filled insulating space 23 therebetween. Space 23 is hermetically sealed and is filled with air or neon, for instance. The metal top member 24 is downwardly inclined from top member 22 and the top members are joined air-tightly to each other and to frame 21, as shown at 25, 26 and 26'. Member 24 may be an aluminum or iron sheet and the atmospheric air will cool the same so as to cool its inner surface and condense thereon water vapor produced by the solar radiation to form dew 30 on the downwardly inclined cooling surface. Similarly to FIG. 1, the dew is collected in gutter or trough 27 whence pipe 28 carries the water into sump 29.

The solar radiation-pervious and insulated top member portion 22 may extend in the same plane as the air-cooled top member portion 24 but it is preferred to arrange the two portions at an angle in relation to each other. In the illustrated embodiment, for instance, the radiation-pervious member 22 is inclined at an angle of about 30° in respect to the soil surface while the metallic member 24 rises therefrom at an angle of about 60°, thus forming a roof over the frame 21 whose two sides descend from an apex.

In practicing the invention, it is desirable to arrange the radiation-pervious top member so that the radiation will impinge upon it at a maximum angle, i.e. 90°, for a maximum period of time. This will increase the heat energy available for evaporating water from the soil, and therefore, will improve the output of distilled water. The condensed dew will run down the cooling surface into the gutter without dripping back to the soil.

The graph of FIG. 3 shows the experimental results obtained per 24 hours with an apparatus according to FIG. 2, under somewhat different weather conditions, with one square meter of soil covered by the frame. Curves $a$ and $b$ indicate the water yield in a 24-hour period when the sun was covered by clouds for five hours. The yield indicated by curve $c$ was obtained in 24 daylight hours but with six hours of cloudy weather. When the apparatus is operated during successive nights, about one-third to one-fourth of the water quantity obtained during daylight is collected.

It is obvious from the above description that this simple and economical apparatus may be used to great advantage for obtaining fresh water in all areas where fresh drinking water is not available, such as in deserts and places far removed from springs or rivers. Even such apparently dry soil contains moisture rising from underground water levels by capillary action through the soil and this moisture can be extracted by solar heat and then condensed to yield fresh water by the apparatus of the present invention.

While this invention has been described in connection with certain preferred embodiments thereof, it will be clearly understood that many modifications and variations may occur to those skilled in the art, particularly after benefiting from the present teaching, without departing from the spirit and scope of the invention as defined in the appended claims.

What is claimed is:

1. An apparatus for extracting and collecting water from soil, comprising a frame, a top member placed airtightly on the frame, said top member being of a material which is impervious to air and at least a part of said top member being of a material pervious to solar radiation, said frame and said top member jointly constituting a receptacle having an open orifice surrounded by said frame, said frame including means for airtightly engaging a soil surface in a position in which said surface closes said orifice, a cooling means spaced from the orifice and having a surface in said receptacle for condensing water vapor thereon, collecting means within said receptacle for collecting the condensed water vapor from said surface, a water sump installed outside said receptacle and conduit means connecting the collecting means with said water sump.

2. The apparatus of claim 1, wherein said frame is heat insulated.

3. The apparatus of claim 1, wherein said radiation-pervious material is a transparent sheet material.

4. The apparatus of claim 1, wherein said cooling surface is downwardly inclined from the horizontal and said collecting means is arranged adjacent the downward end of the cooling surface.

5. An apparatus for extracting and collecting water from soil, comprising a frame, a top member placed airtightly on the frame, said frame and said top member jointly constituting a receptacle having an open orifice surrounded by said frame, said frame including means for airtightly engaging a soil surface in a position in which said surface closes said orifice, said top member being of a material pervious to solar radiation but impervious to air, whereby solar radiation penetrating through the top member causes water in the soil to evaporate, an inner surface of the top member spacedly facing the orifice constituting a cooling surface whereon the water vapor condenses into a dew, said top member being inclined downwardly from the horizontal, a dew collecting gutter means arranged on said frame adjacent the downward end of the cooling surface, a water sump installed outside the frame and conduit means connecting the gutter means with said water sump.

6. The apparatus of claim 5, wherein said frame is heat insulated.

7. An apparatus for extracting and collecting water from soil, comprising a frame, a heat-insulating first top member and an air-cooled second top member, said top members being of a material impervious to air and being joined air-tightly to each other and to said frame to constitute therewith a receptacle having an open orifice surrounded by said frame, said frame including means for airtightly engaging a soil surface in a position in which said surface closes said orifice, the first top member being of a material pervious to solar radiation, and the second top member being of metal and having an inner surface inclined toward said orifice and spaced from said soil surface whereon water vapor may condense into a dew, gutter means within said frame for collecting the dew, the gutter means being arranged adjacent said orifice and said second top member, a water sump installed outside said frame and conduit means connecting the gutter means with the water sump.

8. The apparatus of claim 7, wherein the frame is heat insulated.

9. The apparatus of claim 7, wherein said first top member consists of two parallel transparent plates defining a fluid-filled insulating space therebetween.

10. The apparatus of claim 9, wherein said space is filled with air.

11. The apparatus of claim 9, wherein said space is filled with neon.

References Cited by the Examiner

UNITED STATES PATENTS

| | | | |
|---|---|---|---|
| 419,370 | 1/1890 | Smart | 34—93 X |
| 1,538,957 | 5/1925 | Smith | 34—93 |
| 1,903,510 | 4/1933 | Laboon et al. | 34—93 |
| 2,399,696 | 5/1946 | Schreiber | 34—93 |
| 2,820,744 | 1/1958 | Lighter | 202—234 |

FOREIGN PATENTS

| | | |
|---|---|---|
| 164,679 | 8/1955 | Australia. |
| 210,500 | 12/1955 | Australia. |
| 820,705 | 11/1937 | France. |
| 28,130 | 12/1907 | Great Britain. |

NORMAN YUDKOFF, *Primary Examiner.*

WILBUR L. BASCOMB, *Examiner.*

H. SILVERSTEIN, *Assistant Examiner.*